(12) United States Patent
Granger et al.

(10) Patent No.: US 8,627,969 B2
(45) Date of Patent: Jan. 14, 2014

(54) CORKING OR SECONDARY CORKING CAP WITH A TEARABLE INJURY-PROOF STRIP, AND METHOD FOR MAKING SAME

(75) Inventors: Jacques Granger, Sainte Terre (FR);
Andre Luciani, Teche (FR);
Jean-Marie Bourreau, Le Pizou (FR)

(73) Assignee: Amcor Flexibles Capsules France, Courbevoie (FR)

(*) Notice: Subject to any disclaimer, the term of this patent is extended or adjusted under 35 U.S.C. 154(b) by 59 days.

(21) Appl. No.: 13/146,197

(22) PCT Filed: Feb. 15, 2010

(86) PCT No.: PCT/FR2010/000123
§ 371 (c)(1),
(2), (4) Date: Jul. 26, 2011

(87) PCT Pub. No.: WO2010/094853
PCT Pub. Date: Aug. 26, 2010

(65) Prior Publication Data
US 2011/0309079 A1    Dec. 22, 2011

(30) Foreign Application Priority Data
Feb. 18, 2009  (FR) ..................................... 09 00739

(51) Int. Cl.
*B65D 41/32* (2006.01)
*B65D 17/28* (2006.01)
*B65D 17/34* (2006.01)
*B65D 17/40* (2006.01)

(52) U.S. Cl.
USPC ........... 215/256; 215/255; 215/254; 215/253; 220/276; 220/270

(58) Field of Classification Search
USPC ......... 215/251, 253, 254, 255, 256, 258, 246, 215/DIG. 2, DIG. 4; 220/276
See application file for complete search history.

(56) References Cited

U.S. PATENT DOCUMENTS

| 3,628,688 A | 12/1971 | Haggard et al. |
| 5,222,616 A | 6/1993 | Druesne et al. |
| 6,301,767 B1 | 10/2001 | Granger et al. |

FOREIGN PATENT DOCUMENTS

| EP | 0039298 | 11/2004 |
| FR | 2677333 | 12/1992 |

OTHER PUBLICATIONS

FR_2677333.pdf.*

* cited by examiner

*Primary Examiner* — Mickey Yu
*Assistant Examiner* — Allan Stevens
(74) *Attorney, Agent, or Firm* — Ladas & Parry LLP

(57) ABSTRACT

The invention relates to a stopper capsule, having an axial direction, including a shell, with a head, a skirt, and a joint, where a) the joint is a form joint, b) the form joint has b1) a resilient layer, a set of adjacent layers, b2.1) a barrier layer, b2.2) a malleable support layer with the function of providing the set of adjacent layers a global malleable property such that the joint can be shaped without creation of folds, b2.3) an outer layer having an outer surface which can be compressed by the axial compression resulting from stoppering such as to match the form of the mouth of the neck. The invention further relates to a method of production of the capsule and a method of stoppering.

14 Claims, 3 Drawing Sheets

CORKING OR SECONDARY CORKING CAP WITH A TEARABLE INJURY-PROOF STRIP, AND METHOD FOR MAKING SAME

This application is a 371 of PCT/FR2010/000123 filed on Feb. 15, 2010, which is incorporated herein by reference.

The invention relates to an aluminum or aluminum alloy cap, the skirt of which, typically designed to be crimped over the neck of a bottle or container, is fitted with a tearable strip enabling the separation of the upper and lower parts of the cap; and also relates to the method for obtaining this cap.

Through patent EP-B-0 039 298, the existence is known of a secondary corking cap having a head and skirt, the edge of which is designed to be crimped onto the ring of the neck of a bottle and which has a pre-cut annular strip that has, on either side of a gap, ends molded into the form of two opening tabs designed to allow the upper part of the cap to be torn and removed by means of the simultaneous traction of these tabs in opposite directions. To make it easier to grasp these opening tabs, they have a rough surface that resembles the axial undulations obtained by embossing or knurling. In order to simplify manufacture, this rough surface is produced along the whole surface of the strip before the gap in the annular strip is cut. This cap, like most caps with a tearable strip, has the disadvantage of presenting cut edges that could cause injury—particularly if the skirt is thick and made from strain-hardened aluminum alloy—both on the strip itself and on the sections of skirt that are separated when the strip is removed.

In the French patent FR 2 677 333, the applicant proposed, in order to reduce the risk of injury, a corking cap having a head and a skirt including a tearable circumferential strip with an opening tab and delimited by two continuous external circumferential grooves that constitute weakened lines. Said tearable circumferential strip presents axial undulations that are present throughout its whole thickness and which extend toward the upper part and lower part of the skirt, beyond said circumferential grooves. With undulations such as these, which extend either side of the grooves, the strip obtained after tearing has undulating edges that present little risk of injury. The broken edges of the sections of skirt that result from the tearing that enabled the strip to be removed are also undulating in form and generally present little risk of injury. However, the risk of injury by the broken edges is still not sufficiently low, bearing in mind the considerable number of caps of this type that are distributed among the general public, particularly when said caps are made from strain-hardened aluminum alloy. For such caps, the tear is still sometimes not perfectly continuous and linear, exhibiting the beginnings of some secondary tear lines, which form particularly aggressive edges.

However, the aim is to ensure that the probability of injury when this very common type of bottle is first opened is as low as possible. The applicant has therefore sought to perfect a corking cap or secondary corking cap that has a tearable strip and for which, particularly when made of metal—typically aluminum or strain-hardened aluminum alloy—the tear presents a minimal risk of injury for the user.

A first object according to the invention is a cap—corking cap or secondary corking cap—having a head and a metal skirt including a tearable circumferential strip delimited by two weakened lines, characterized in that said tearable circumferential strip is covered by a layer of a plastic material that remains rigidly connected to said tearable circumferential strip when removing the latter by tearing said weakened lines.

The applicant has observed that, in order to effectively reduce the risk of creating broken edges that could cause injury, the tears are advantageously guided along the weakened lines when said layer of plastic material covers the majority of the circumference of the tearable circumferential strip, which, if it adheres effectively to said tearable strip modifies the overall mechanical behavior of said tearable strip. This substantially reduces the risk of sustaining a cut when said tearable circumferential strip is removed.

Advantageously, said layer of plastic material is an external coating that substantially covers the tearable circumferential strip around the whole of its circumference. Advantageously, this layer is continuous, that is, more specifically, that it covers said tearable circumferential strip in a continuous fashion substantially across its whole circumference. This presents the advantage, on the one hand, of reducing the risk of portions of the layer or coating becoming detached during the tearing of said strip and, on the other hand, of avoiding abrupt movements and thus making it possible to impose a stable regime of constraints in the vicinity of the successive areas where the break occurs and which is propagated circumferentially. The whole circumference is not necessarily covered, for example due to the presence of a gap created to facilitate the insertion of a finger.

Whatever method is used to ensure the deposit and adherence of said external plastic coating to said tearable circumferential strip, it is observed that the risk of injury for the user is very much reduced, in particular when the cap is made from strain-hardened aluminum alloy. The plastic coating increases the thickness of the tearable circumferential strip, which on the one hand distances the fingers from the tear zone, situated on the edge of said strip, and on the other hand serves as an additional support for the strip and provides a more continuous break, by guiding the tear along the weakened lines and by preventing the creation of secondary tears.

Said external coating may be a plastic sleeve that adheres to said tearable circumferential strip, for example by gluing, using for instance an adhesive material suited to the varnish that generally covers the metal skirt of the cap. The adhesive material may, for example, be a copolymer (ethylene, acrylic acid). One might also use heat sealing, by following the process described by the applicant in its patent EP 1 009 674: this involves using a cap covered with a varnish—typically an epoxy varnish—that is suitable for the forming of the cap by means of drawing and which includes a thermoplastic material in a divided state, in the form of particles typically microns in size, with a weight ratio of 5-30%. Said thermoplastic material in a divided state in the varnish may, for example, be a polyolefin, in particular a polypropylene or a polyethylene, or even a thermoplastic elastomer. The sleeve, which is made from a thermoplastic material that is compatible in fusion with said plastic material in a divided state in the varnish, is placed on the wall of the skirt of the cap at the level of the tearable circumferential strip and the contact zone is then heated, for example by induction.

The tearable circumferential strip may be delimited by two circumferential grooves, typically external, which constitute said weakened lines. The coating may cover said circumferential grooves so that fingers are protected from the broken edges. Equally, it is possible to deposit the coating on only a part of the tearable circumferential strip, in this case with said metal skirt preferably presenting transversal undulations which, as in patent FR 2 677 333, affect its whole thickness and extend either side of said non-covered circumferential grooves.

In a preferred method for the invention, said external coating is produced by overmolding a plastic material on to the outer wall of the tearable circumferential strip and anchoring the layer molded in this way by passing the plastic material through the perforations made in the skirt at the level of said tearable circumferential strip. Advantageously, there is, on the internal wall of the cap, at the level of the tearable circumferential strip, an internal annular groove designed to accommodate the part of the injected plastic material that is passed through the perforations, in order to form a continuous anchoring layer. In view of the thinness of the cap, this internal annular groove may be produced by molding on a shaped punch, so that the forming of the skirt allows an external annular projection to be visible on the cap before the injection of said plastic material.

Advantageously, the perforations are made in such a way that the bridges that link the plastic material accommodated in said internal annular groove and the plastic material that constitutes the external coating are substantially oriented in the axial direction. The perforations shall preferably be regularly distributed around the circumference of the strip. The opening of each perforation—which corresponds to the section of the plastic bridge linking the coating to its anchoring layer—and the angular pitch between two neighboring perforations are defined so that said external coating remains attached to said strip when it is removed by tearing along the weakened lines.

To obtain such caps, one can proceed in the following way: a cap is produced by means of drawing; then, an annular projection is produced—by means of rolling, using an appropriate mandrel, typically in the middle of the tearable circumferential strip—that is in slight outward relief and which presents de facto an internal annular groove that makes it possible to accommodate part of the plastic material that passes via the perforations. Said projection typically presents a "slotted" cross-section, with a cylindrical peripheral wall and side walls. The perforations may be produced by rolling at the level of said side walls when said slotted shape is formed or during the later straining of said peripheral wall.

For example, a mandrel and a roller whose shapes combine to simultaneously create the side walls and perforations could be designed. During an operation commonly known as "molding", the cap is placed on a mandrel with a diameter that is noticeably smaller than the diameter of the skirt of the cap and a roller is applied on the part of the cap that is in contact with the mandrel, by imposing a radial force in the direction of the mandrel. The roller and the mandrel turn in a coordinated fashion, so that the circumference of the wall of the cap is progressively shaped under the combined action of the roller and the mandrel. If the roller has a concave area within its active section that coincides with a rib in relief on the mandrel, the annular "slotted" projection previously described can be obtained.

The roller may also present excrescences likely to "depress" the wall of the cap if the mandrel presents a cavity at this level. By applying a roller which has teeth or excrescences of this type to the edges of the concave area and by using it to work on a rib in relief on the mandrel, this creates not just an annular rib with a slotted section, but also a significant strain on the skirt of the cap at the level of the extremities of the teeth of the roller, of such an amplitude that a local break may occur that creates a perforation at the base of the slotted section. In other words, with roller teeth of a sufficient radial height, a local split $\sigma_{rz}$ can be created with an intensity that is favorable to the appearance of perforations, the openings of which extend essentially in a transversal direction, so that, after injection molding, the bridges of plastic material resulting from the flow of the plastic material through these orifices are substantially oriented in an axial direction. In the examples given below, a number of methods where the skirt of the cap is strained and perforated using this molding process can be found.

As in the production method where the layer of plastic material is a sleeve glued to the wall of the skirt of the cap, the tearable circumferential strip covered by a layer of overmolded and anchored plastic material may be delimited by two circumferential grooves, typically external, that constitute said weakened lines. However, as the final two examples below show, it is also possible to produce weakened lines by molding, typically concomitantly with the production of the annular projection and perforations intended for the anchoring bridges. In this case, it is recommended that the coating covers the perforations of the weakened lines, in such a way that fingers are protected from the broken edges.

In an advantageous aspect of the invention, illustrated by the final example given below, the weakened lines are constituted by the perforations, which are produced in such a way as to enable the anchoring of the external coating. Typically, the perforations are produced on the metal skirt of the cap so that they are aligned circumferentially, each perforation separated from the next by metal bridges with a small cross-section. When a central annular projection is created to produce an annular groove able to accommodate the anchoring layer, the circumferential alignments of the perforations that enable the passage of the plastic toward the annular groove may constitute—as given in example 4 below—said weakened lines.

The caps more specifically concerned by the invention are corking caps made from aluminum or strain-hardened aluminum alloy, typically a 3105 or 8011 alloy, covered externally by an epoxy varnish. Any plastic material may be suitable for the covering of the tearable circumferential strip, if said tearable strip is fixed to the skirt by gluing. It is simply necessary to find an adhesive that is suitable for use with the varnish that covers the metal skirt. An elastomeric plastic that is pleasant to the touch should preferably be chosen. Regarding overmolded and anchored coatings, a thermoplastic material, like a polyolefin or a thermoplastic elastomer such as a SEBS (styrene-ethylene-butylene-styrene) copolymer, may be suitable.

The caps concerned by the invention generally have a diameter of between 15 mm and 50 mm. They have a skirt with a thickness of between 0.15 mm and 0.30 mm, typically between 0.20 mm and 0.25 mm, for example 210 µm for diameters of less than 30 mm and 230 µm for diameters of more than 30 mm. The tearable circumferential strip generally has a width of between 4 mm and 10 mm. The layer of plastic material, which, according to the invention, covers said tearable circumferential strip, shall preferably have an overall thickness of more than 0.30 mm and which typically is around 1 mm. By overall thickness, it is meant the thickness of the sleeve glued to the skirt or the sum of the thicknesses of the external coating and the injection-molded internal anchoring layer. Obviously, the beneficial influence of the layer of plastic material varies according to its thickness and the mechanical behavior of the plastic used. However, in general, it can be observed that, below 0.3 mm, the plastic layer is too thin to significantly modify the mechanical behavior of the whole of the tearable circumferential strip, which does not make it possible to significantly reduce the risk of sustaining a cut when said tearable circumferential strip is removed.

The invention may also concern thinner metal caps, such as secondary corking caps that generally have an overall thickness of between 0.06 mm and 0.18 mm, typically between 0.075 mm and 0.15 mm, and which are made from aluminum or aluminum alloy, typically of types 1050, 1100 or 1200

(standardized Aluminum Association references), or even made from tin or tin alloy, in particular a ternary alloy of tin, bismuth and antimony.

Advantageously, the tearable circumferential strip has an opening tab. To this end, the skirt, together with its tearable circumferential strip, typically covered by said layer of plastic material, is cut locally in such a way as to obtain a gap whose form presents at least one significantly axial part that crosses the width of the strip and at least one part oriented in the direction of one of the weakened lines. The extremity of the strip contained within this gap can then serve as an opening tab.

Advantageously, the opening tab is covered by said layer of plastic material. The gap shall preferably be cut after the deposit of the layer of plastic material. Also, the layer of plastic material shall preferably be of a greater thickness at the level of the opening tab, in order to make it easier for the finger to grasp.

The aim of the invention is also to provide a method for manufacturing a cap with a tearable circumferential strip according to the invention, in which:

a) a blank cap made from aluminum or strain-hardened aluminum alloy is prepared;
b) the cap is fitted to a cylindrical mandrel, the relief of which is locally complementary to that of the roller that will be applied in the following step (c);
c) through the application of a roller on the skirt of said cap, by exerting a significantly radial force in the direction of said mandrel, an annular projection is produced and perforations are produced in such a way as to be regularly distributed around the circumference of the skirt, with the openings of these perforations extending substantially in a transversal plane; optionally, on either side of the annular projection, perforations are produced in such a way as to be regularly distributed around the circumference of the skirt with a view to constituting weakened lines of said tearable circumferential strip;
d) the cap is fitted onto a molding mandrel, the diameter of which shall be substantially equal to the internal diameter of the cap;
e) next, on the external wall of the skirt of the cap, an external mold is applied, the imprint of which takes the form of an annular cavity that coincides with said annular projection;
f) the plastic material, typically a polyolefin or a thermoplastic elastomer, is injected into the cavity of the mold, which is constituted by the joining of the surface of the mandrel and the annular imprint of the external mold, and which is crossed by the skirt of the cap provided with said perforations;
g) the external mold is removed and the mandrel is removed from the molding.

If the weakened lines have not been produced during step (c), the method shall be completed by the following step:

h) the cap is fixed on to a mandrel, the cylindrical surface of which is smooth and, in the vicinity of the lower and upper edges of the overmolded and anchored plastic coating, typically at a distance of 0.5 mm from said edges, two weakened lines are created by means of indentation using a roller with a suitable profile, typically including a bearing edge with a width of between 0.05 mm and 0.1 mm, with said edge contained between two beveled sections; together, said edge and said beveled sections form a truncated V, the internal angle between the two beveled sections being between 60° and 120°;

Finally, in order to obtain the opening tab, a gap is created in the skirt, typically by punching. The form of this gap shall be at least partly axial, crossing the width of the strip, and at least partly oriented in the direction of one of the weakened lines.

Figure 4:
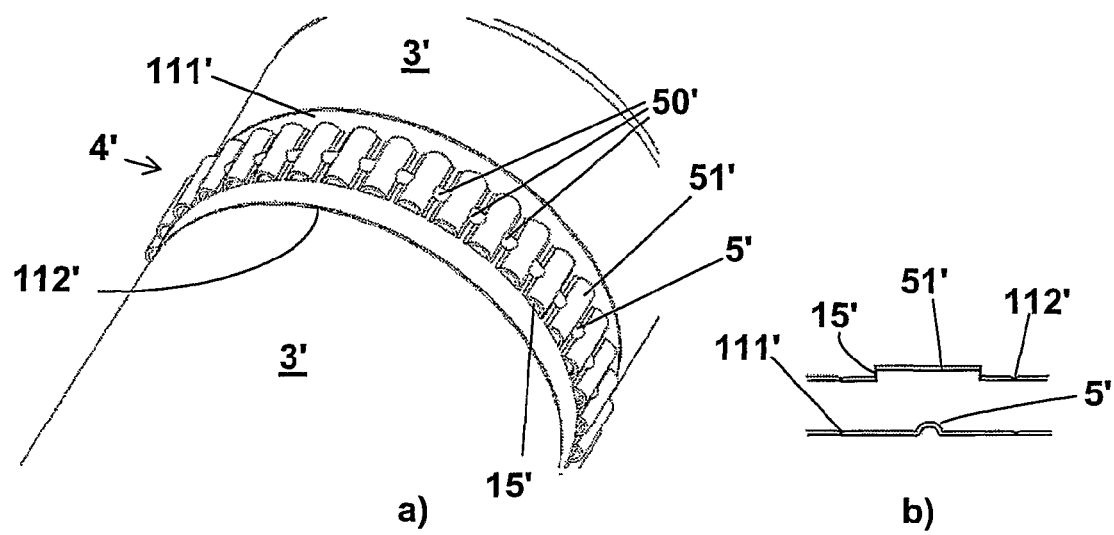
Figure 6:
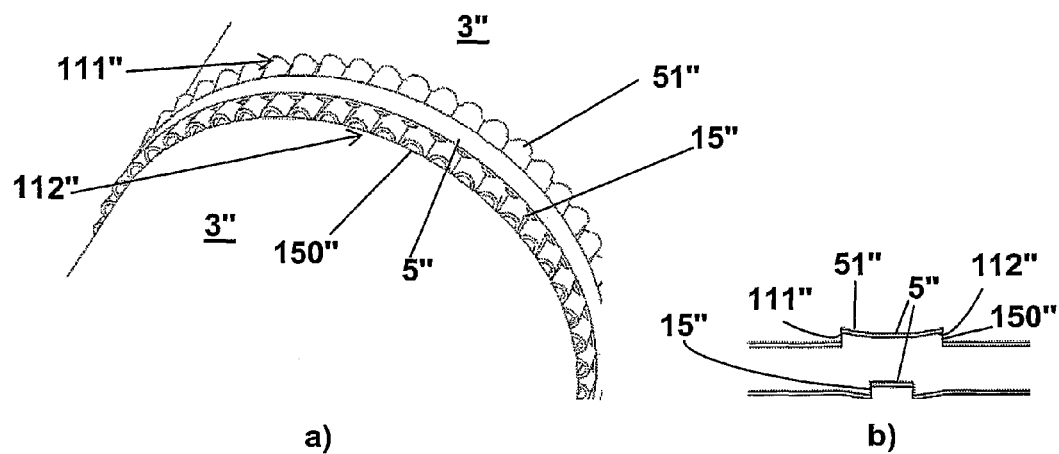
Figure 7:
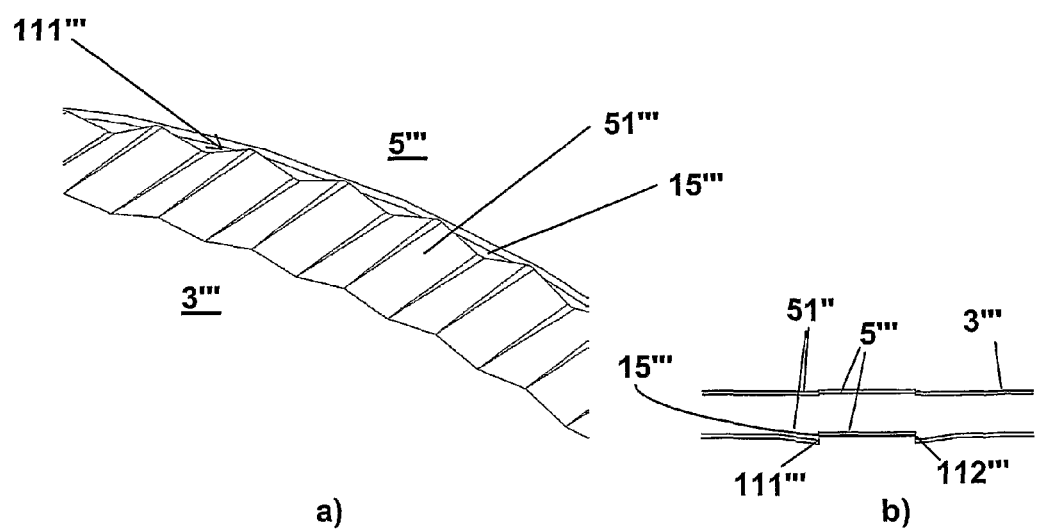

FIGS. 4, 6 and 7 illustrate three molded caps before the injection of the plastic material, on the basis of which secondary corking caps with tearable circumferential strips, according to the invention, can be produced. The detail of the molded part of the tearable circumferential strip is illustrated in perspective in FIGS. 4a, 6a and 7a. The sections with two radial planes passing respectively via the peak and the trough of each undulation are illustrated in FIGS. 4b, 6b and 7b.

Figure 5:
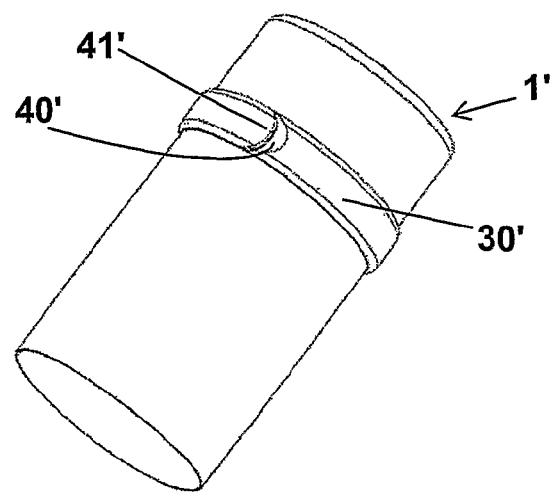

FIG. 5 illustrates a secondary corking cap with a tearable circumferential strip according to the invention, after the incision of the gap delimiting the opening tab.

PRODUCTION METHODS

EXAMPLE 1

FIG. 1-3

Figure 1:
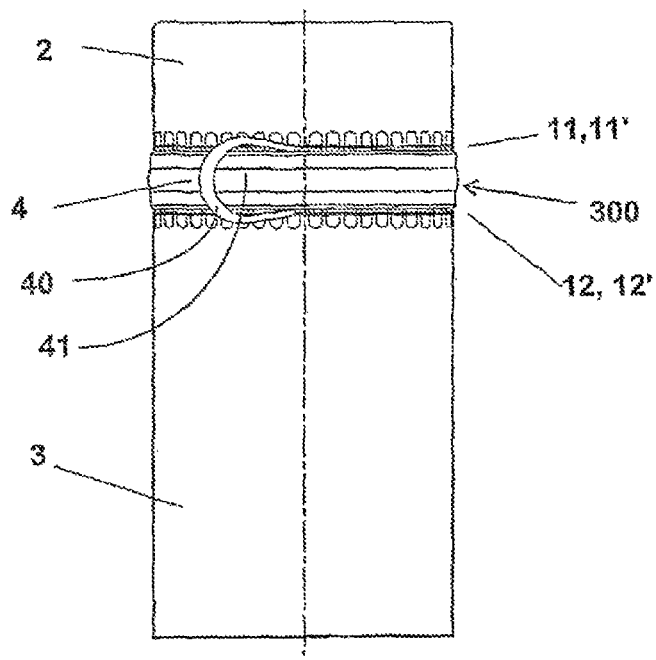
FIG. 1 illustrates a corking cap with a tearable strip according to the invention.
Figure 2:
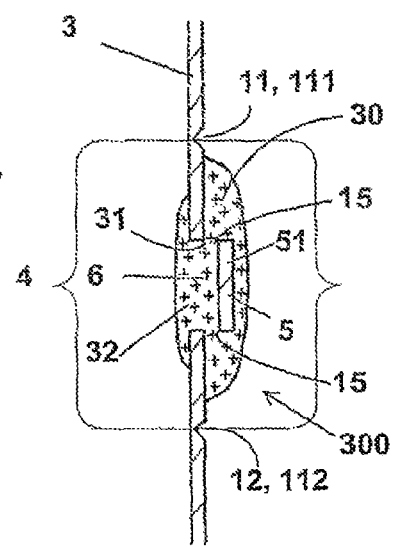
FIG. 2 illustrates, in a cross-section view, the part of the skirt of the cap in FIG. 1 located at the level of the tearable circumferential strip.
Figure 3:
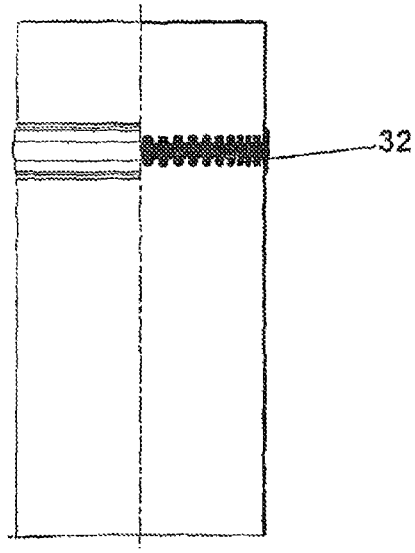
FIG. 3 illustrates, in the right-hand cross-section view, the cap in FIG. 1 before the undulations are produced on either side of the grooves.

A first method for producing caps according to the invention is illustrated in FIGS. 1 to 3. The cap has a head (2) and a metal skirt (3) including a tearable circumferential strip (4) delimited by two weakened lines (11 and 12). The tearable circumferential strip (4) is covered by a layer (300) of plastic material, which remains rigidly connected to said tearable circumferential strip when it is removed by tearing said weakened lines. The layer (300) made of plastic material is continuous: it comprises an external coating (30) that covers the totality of the circumference of the tearable circumferential strip (4) and which is held in place by an internal layer of plastic material (32).

The plastic coating increases the thickness of the tearable circumferential strip, which on the one hand distances the fingers from the tear zone, situated on the edge of said strip, and on the other hand reinforces the mechanical behavior of the strip and provides a more continuous break, by guiding the tear along the weakened lines and by preventing the creation of secondary tears.

Said external coating is produced by overmolding polypropylene to the outer wall of the tearable circumferential strip (4) and anchoring the layer molded in this way by passing the plastic material through the perforations (15) made in the skirt (3) at the level of said tearable circumferential strip. On the internal wall of the cap, at the level of the tearable circumferential strip, an internal annular groove (6) is created. This annular groove is designed to accommodate the part of the injected plastic material which passes via the perforations, in order to form a continuous anchoring layer (32). This internal annular groove (6) is produced using a stamping process, so that the forming of the skirt leaves an external annular projection (5) visible on the cap before the injection of said plastic material.

The perforations are made in such a way that the anchoring bridges (31) that link the plastic material accommodated in said internal annular groove (6) and the plastic material that constitutes the external coating (30) are substantially oriented in the axial direction. In total, 40 perforations (15) are regularly distributed around the circumference of the strip (4). The surface area of the opening of each perforation is typically 0.1 mm².

The projection (5) presents a "slotted" cross-section, with a cylindrical peripheral wall (51) and side walls of low radial height, with said radial height being typically of the order of twice the thickness of the skirt. The perforations are produced by molding at the level of said side walls during the forming of said annular projection.

The cap is a corking cap made from strain-hardened aluminum alloy, covered on the outside by an epoxy varnish. Its skirt has a diameter of 33 mm and a thickness of 0.23 mm. The tearable circumferential strip has a width of 8 mm. The layer of plastic material that covers said tearable circumferential strip has an overall average thickness of 1.0 mm.

The tearable circumferential strip has an opening tab (41): after the overmolding of the layer of plastic material, the skirt is cut locally in such a way as to obtain a gap (40) which contains the opening tab.

The tearable circumferential strip (4) is delimited by two external circumferential grooves (111 and 112), which constitute said weakened lines (11 and 12). The external coating (30) covers only a part of the width of the tearable circumferential strip (4). In order to reduce the risk of injury, transversal undulations are produced by molding on to said metal skirt. These undulations affect the whole thickness of the skirt (3) and extend either side of the non-covered circumferential grooves (111 and 112).

EXAMPLE 2

FIGS. 4a, 4b & 5

A second method of production involves straining the skirt (3') of the cap, as illustrated in FIGS. 4a and 4b, in order to enable the anchoring of a layer of overmolded plastic material. After the deposit of the external coating (30') made from plastic material, the cap (1') takes the form illustrated in FIG. 5.

The metal skirt (3') includes a tearable circumferential strip (4') delimited by two annular grooves (111' and 112'), which constitute said weakened lines. In the middle of this tearable strip, a series of undulations (51') in relief is molded, with a generally semi-cylindrical shape and at the extremities of which the perforations (15') can be found. The undulations (51') are connected to one another by the portions (50') of an annular projection (5') with a substantially semicircular cross-section.

A layer of plastic material is deposited by overmolding in order to cover the outside of the tearable strip, including the annular grooves (111' and 112'). The plastic material passes via the perforations (15') and flows to fill the inside of the undulations (51'), which are connected to one another by portions (50') of the annular projection (5'). In this way, a continuous annular anchoring layer is obtained. After stripping, the gap (40') is produced, which makes it possible to delimit an opening tab (41').

EXAMPLE 3

FIGS. 6a & 6b

A third method of production involves straining the skirt (3") of the cap, as illustrated in FIGS. 6a and 6b, in order on the one hand to produce weakened lines, and on the other hand to enable the anchoring of a layer of plastic material. By molding, the tearable circumferential strip is formed by creating a central annular projection (5") and a series of undulations (51"), in relief, in the shape of curved "Roman" tiles, which become embedded radially when they approach said central annular projection (5"). At those ends of said undulations (51") farthest from said central annular projection (5"), end perforations (150") are formed, the circumferential alignments of which constitute weakened lines (111" and 112"). At those ends of said undulations (51") closest to said central annular projection (5"), perforations (15") are formed in order to constitute anchoring bridges.

Next, a layer of plastic material is deposited by overmolding in order to cover the outside of the tearable strip, including the weakened lines (111" and 112"). The plastic material passes via the perforations (15") and flows within to fill the inside of the annular projection (5") and joins the plastic material that passed via the end perforations (150"). In this way, a continuous annular anchoring layer is obtained. After stripping and the production of the gap that makes it possible to delimit an opening tab, the cap takes the form illustrated in FIG. 5.

EXAMPLE 4

FIGS. 7a & 7b

In this fourth method of production, the weakened lines (111''' and 112''') are constituted by the perforations (15''') that are created either side of the cylindrical side wall of the central annular projection (5''') in order to enable the passage of the plastic material toward the annular groove and thus create the anchoring layer for the external coating. As in the previous example, the method involves straining the skirt (3''') of the cap, as illustrated in FIGS. 7a and 7b, in order to produce weakened lines and enable the anchoring of a layer of plastic material. By molding, the tearable circumferential strip is formed by creating a central annular projection (5''') and a series of undulations (51''') in the form of a curved "Roman" tile and which become embedded radially when they approach said central annular projection (5'''). At those ends of said undulations (51''') farthest from said central annular projection (5'''), the skirt is not strained or is little strained (see case illustrated in FIG. 7a). At those ends of said undulations (51") closest to said central annular projection (5'''), perforations (15''') designed to form both anchoring bridges and weakened lines (111''' and 112''') are formed.

The shape of the roller is such that, after its passage over the skirt when the latter is supported by a central mandrel, the skirt is sheared in its thickness, incompletely at the level of the peak of the undulations (the residual thickness is typically of the order of half or two thirds of the initial thickness), and completely at the level of the troughs of said undulations, to the point of breaking and becoming embedded to a depth similar in magnitude to the thickness. In this way, the peripheral cylindrical wall of the central annular projection (5''') is attached to the rest of the skirt (3''') only by metal bridges with a small cross-section.

During tearing along the weakened lines (111''' and 112'''), it is these metal bridges with a small cross-section that are sheared, while bridges made from plastic materials, which are not subjected to shearing, do not break, thus ensuring that the coating remains rigidly connected to the torn strip.

The invention claimed is:
1. Cap having a head and a metal skirt including a tearable circumferential strip delimited by two weakened lines, wherein said tearable circumferential strip is covered by a layer of plastic material, which remains rigidly connected to said tearable circumferential strip when it is removed by tearing along said weakened lines;
  wherein said layer of plastic material is an external coating obtained by the overmolding of a plastic material onto an external wall of the metal skirt and the anchoring of the layer thus molded by the passage of said plastic material through perforations in said metal skirt at the level of said tearable circumferential strip.

2. Cap according to claim 1, wherein said layer of plastic material is an external coating made from plastic material that substantially covers the whole circumference of said tearable circumferential strip.

3. Cap according to claim 1, in which said layer of plastic material covers said tearable circumferential strip in a continuous fashion substantially across its whole circumference.

4. Cap according to claim 1, in which said tearable circumferential strip is delimited by two circumferential grooves, typically external, which constitute said weakened lines.

5. Cap according to claim 2, in which said coating covers only a part of the width of said tearable circumferential strip, with said metal skirt presenting transversal undulations which affect its whole thickness and extend either side of said non-covered circumferential grooves.

6. Cap according to claim 1, in which said layer of plastic material is a sleeve made from plastic material that adheres to said tearable circumferential strip.

7. Cap according to claim 1, in which an internal wall of said cap has, at the level of said tearable circumferential strip, an internal annular groove designed to accommodate the part of the injected plastic material which passes via said perforations, in order to form a continuous anchoring layer.

8. Cap according to claim 7, in which said perforations are made in such a way that anchoring bridges that link the plastic material accommodated in said internal annular groove and the plastic material that constitutes the external coating are substantially oriented in the axial direction.

9. Cap according to claim 1, in which said weakened lines are constituted by the perforations which are produced to allow said anchoring of the external coating.

10. Cap according to claim 1, in which said metal skirt has a thickness of between 0.15 mm and 0.30 mm, preferably between 0.20 mm and 0.25 mm; said tearable circumferential strip has a width of between 4 mm and 10 mm; and said layer of plastic material, in the form of a sleeve or external coating that is rigidly connected to an internal anchoring layer, has an overall average thickness of more than 0.30 mm.

11. Cap according to claim 1, in which said tearable circumferential strip has an opening tab.

12. Cap according to claim 11, in which said opening tab is also covered by said external coating made from plastic material.

13. Manufacturing process for a cap having a tearable circumferential strip, in which:
  a) a blank cap made from aluminum or strain-hardened aluminum alloy is prepared;
  b) the cap is fitted to a cylindrical mandrel, the relief of which is locally complementary to that of the roller that will be applied in the following step (c);
  c) through the application of a roller on a skirt of said cap, by exerting a significantly radial force in the direction of said mandrel, an annular projection is produced and perforations are produced in such a way as to be regularly distributed around the circumference of the skirt, with the openings of these perforations extending substantially in a transversal plane;
  d) the cap is fitted onto a molding mandrel, the diameter of which shall be substantially equal to the internal diameter of the cap;
  e) next, on an external wall of the skirt of the cap, an external mold is applied, the imprint of which takes the form of an annular cavity that coincides with said annular projection;
  f) the plastic material, typically a polyolefin or a thermoplastic elastomer, is injected into the cavity of the mold, which is constituted by the joining of the surface of the mandrel and the annular imprint of the external mold, and which is crossed by the skirt of the cap provided with said perforations;
  g) the external mold is removed and the mandrel is removed from the molding;
  wherein the production of the weakened lines that delimit said circumferential strip is performed either during step (c) or after step (g), by means of indentation using a roller with a suitable profile.

14. Manufacturing process according to claim 13, completed by the following final step: a gap is created in the skirt, typically by punching, wherein the form of this gap shall be at least partly axial, crossing the width of the strip, and at least partly oriented in the direction of one of the weakened lines.

* * * * *